US012340665B2

(12) United States Patent
Berman

(10) Patent No.: US 12,340,665 B2
(45) Date of Patent: *Jun. 24, 2025

(54) GAMING DEVICE HAVING POKER MYSTERY FEATURE

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,504

(22) Filed: Apr. 5, 2024

(65) Prior Publication Data

US 2024/0249602 A1 Jul. 25, 2024

Related U.S. Application Data

(63) Continuation of application No. 18/092,893, filed on Jan. 3, 2023, now Pat. No. 11,954,981, which is a continuation of application No. 17/207,163, filed on Mar. 19, 2021, now Pat. No. 11,545,008, which is a continuation of application No. 16/694,671, filed on Nov. 25, 2019, now Pat. No. 10,957,163.

(60) Provisional application No. 62/771,021, filed on Nov. 23, 2018, provisional application No. 62/771,022, filed on Nov. 23, 2018, provisional application No. 62/771,025, filed on Nov. 23, 2018.

(51) Int. Cl.
*G07F 17/32* (2006.01)

(52) U.S. Cl.
CPC ...... *G07F 17/3293* (2013.01); *G07F 17/3204* (2013.01); *G07F 17/3251* (2013.01); *G07F 17/3258* (2013.01); *G07F 17/3267* (2013.01)

(58) Field of Classification Search
CPC ............ G07F 17/3293; G07F 17/3204; G07F 17/3251; G07F 17/3258; G07F 17/3267
USPC ............................................... 463/13, 12, 11
See application file for complete search history.

(56) References Cited

U.S. PATENT DOCUMENTS

| | | | | |
|---|---|---|---|---|
| 2008/0234036 A1* | 9/2008 | Reddicks | G07F 17/3267 | 463/25 |
| 2013/0102385 A1* | 4/2013 | Oosthoek | G07F 17/3258 | 463/27 |
| 2013/0196756 A1* | 8/2013 | Nguyen | G07F 17/3227 | 463/29 |
| 2014/0057702 A1* | 2/2014 | Lowell | G07F 17/3244 | 463/25 |
| 2014/0171173 A1* | 6/2014 | Strom | G07F 17/3244 | 463/20 |
| 2017/0206734 A1* | 7/2017 | Nguyen | G07F 17/3241 | |
| 2019/0139364 A1* | 5/2019 | Lamb | G07F 17/3244 | |
| 2019/0392670 A1* | 12/2019 | Singer | G07F 17/3244 | |

(Continued)

*Primary Examiner* — Pierre E Elisca

(57) ABSTRACT

Embodiments of the present invention set forth systems, apparatuses and methods for providing gaming devices having a poker mystery feature. Accordingly, a gaming device can be configured to have sub-symbol overlays that specify a replication feature that may replicate a card associated with the sub-symbol overlay and either replace a specified card that is adjacent to the card associated with the sub-symbol overlay, or create a multi-indicia card using the replication. Replication may mean a direct copy of the card associated with the sub-symbol overlay or may mean providing a card that is related to the card associated with the sub-symbol overlay according to predefined rules.

8 Claims, 15 Drawing Sheets

(56) References Cited

U.S. PATENT DOCUMENTS

2020/0126359 A1 * 4/2020 Moody .............. G07F 17/3267

* cited by examiner

GAMING DEVICE HAVING POKER MYSTERY FEATURE

RELATED APPLICATIONS

This application is a continuation of U.S. application Ser. No. 18/092,893, filed Jan. 3, 2023, now U.S. Pat. No. 11,954,981, which is a continuation of U.S. application Ser. No. 17/207,163, filed Mar. 19, 2021, now U.S. Pat. No. 11,545,008, which is a continuation of U.S. application Ser. No. 16/694,671, filed Nov. 25, 2019, now U.S. Pat. No. 10,957,163, which claims the benefit of Provisional Patent Application No. 62/771,021, filed on Nov. 23, 2018, Provisional Patent Application No. 62/771,025, filed on Nov. 23, 2018, and Provisional Patent Application No. 62/771,022, filed on Nov. 23, 2018, to all of which priority is claimed pursuant to 35 U.S.C. § 119(e) and all of which are incorporated herein by reference in their entirety.

FIELD OF THE INVENTION

This disclosure relates generally to games, and more particularly to systems, apparatuses and methods for providing gaming devices having a poker mystery feature.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever-wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise provide for gaming devices having a poker mystery feature.

In one embodiment, a gaming device can be configured to have sub-symbol overlays that specify a replication feature that may replicate a card associated with the sub-symbol overlay and either replace a specified card that is adjacent to the card associated with the sub-symbol overlay or create a multi-indicia card using the replication. Replication may mean a direct copy of the card associated with the sub-symbol overlay or may mean providing a card that is related to the card associated with the sub-symbol overlay according to predefined rules.

In another embodiment, a gaming device can be configured to provide a poker game where random cards may have multiple sides. These multi-sided cards may be dealt or drawn during a poker game, where a first side has normal card indicia labeled on it, but a hidden second side (or back side) has bonus indicia such as credit awards, multipliers, wild card indicia, or other game modifying indicia that may be used in the current poker game, or one or more future poker games.

In yet another embodiment, a gaming device can be configured to associate higher pays on a poker paytable with progressive awards, where when a poker hand associated with one of the higher poker pays is awarded, a random determination is made along with a visual presentation to the player, of whether the progressive award associated with that higher poker pay is also awarded to the player.

DETAILED DESCRIPTION

Figure 1:
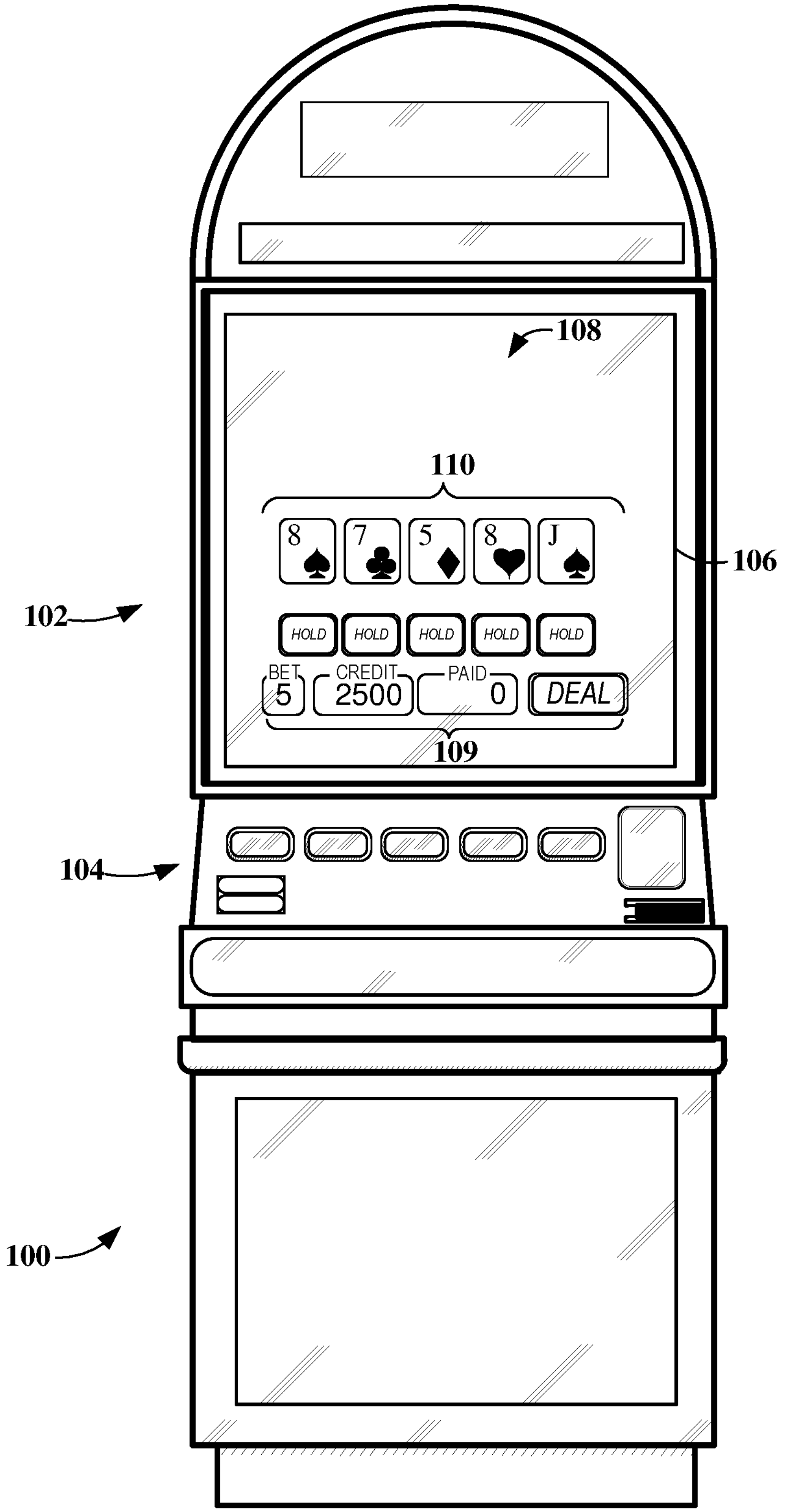
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for providing gaming devices having a poker mystery feature, which may enhance winning result opportunities in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. video poker game) is provided for purposes of facilitating an understanding of the features described herein. However, the principles described herein are equally applicable to any game of chance where an outcome(s) is determined for use in the player's gaming activity.

Some embodiments of the present concept include providing gaming devices (also referred to as gaming apparatuses or gaming machines), gaming systems, and methods of operating these devices or systems to provide game play that provide gaming devices having an item replication feature. In one embodiment, a gaming device can be configured to have sub-symbol overlays that specify a replication feature that may replicate a card associated with the sub-symbol overlay and either replace a specified card that is adjacent to the card associated with the sub-symbol overlay, or create a multi-indicia card using the replication. Replication may mean a direct copy of the card associated with the sub-symbol overlay or may mean providing a card that is related to the card associated with the sub-symbol overlay according to predefined rules.

Some embodiments of the present concept include providing gaming devices (also referred to as gaming apparatuses or gaming machines), gaming systems, and methods of operating these devices or systems to provide game play that provides for gaming devices having items with multiple sides that include gaming indicia. In one embodiment, a gaming device can be configured to provide a poker game where random cards may have multiple sides. These multi-sided cards may be dealt or drawn during a poker game, where a first side has normal card indicia labeled on it, but a hidden second side (or back side) has bonus indicia such as credit awards, multipliers, wild card indicia, or other game modifying indicia that may be used in the current poker game, or one or more future poker games.

Some embodiments of the present concept include providing gaming devices (also referred to as gaming apparatuses or gaming machines), gaming systems, and methods of operating these devices or systems to provide game play that provide gaming devices having a poker mystery feature. In one embodiment, a gaming device can be configured to associate higher pays on a poker paytable with progressive awards, where when a poker hand associated with one of the higher poker pays is awarded, a random determination is made along with a visual presentation to the player, of whether the progressive award associated with that higher poker pay is also awarded to the player.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of these inventive techniques in other types of poker games, slot games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes a display area 102 (also referred to as a gaming display), and a player interface area 104, although some or all of the interactive mechanisms included in the user interface area 104 may be provided via graphical icons used with a touch screen in the display area 102 in some embodiments. The display area 102 may include one or more game displays 106 (also referred to as "displays" or "gaming displays") that may be included in physically separate displays or as portions of a common large display. Here, the game display 106 includes a primary game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity. In video poker embodiments, for example, the user interface 104 may include five physical buttons that correspond to displayed card positions and allow a player to hold (or un-hold) particular cards in a draw poker hand. The user interface 104 may also include a physical "Deal/Draw" button that allows a player to initiate a new game by having cards dealt to the card positions or draw replacement cards after having the opportunity to hold any of the dealt cards. In other poker games, keno games, slot games, or other games of chance different button panels or configurations may be used.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player loyalty information to identify a user or player of the gaming device. This mechanism may be card reader, biometric scanner, keypad, or other input device. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touchscreen, entering text, entering voice commands, or other known data entry methodology.

The game display 106 in the display area 102 may include one or more of an electronic display, a video display, a mechanical display, and fixed display information, such as paytable information associated with a glass/plastic panel on the gaming machine 100 and/or graphical images. The symbols or other indicia associated with the play of the game may be presented on an electronic display device or on mechanical devices associated with a mechanical display. Generally, the display 106 devotes the largest portion of viewable area to the primary gaming portion 108. The primary gaming portion 108 is generally where the visual feedback for any selected game is provided to the user. The primary gaming portion 108 may render graphical objects such as cards, slot reels, dice, animated characters, and any other gaming visual known in the art. The primary gaming portion 108 also typically informs players of the outcome of any particular event, including whether the event resulted in a win or loss.

In some of the example embodiments illustrated herein, the primary gaming portion 108 may display a grid (or equivalent arrangement) of playing cards 110 forming a hand. Here, the grid includes a row of five playing cards 110 forming a video poker hand, which represents a portion of a game play event. For example, if the game play event is a video draw poker game, the gaming device 100 may deal five cards, allow the user to select which cards to hold, deal replacements for the cards not held, and determine a payout based on the final cards in the hand. The illustration and description of five-card-draw poker is for purposes of example and not of limitation; the present invention may be applicable to numerous other card games, such as stud poker or hold 'em poker, as well as other types of gaming activities and apparatuses, such as slot machines, dice, coins, etc.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards for holding prior to draw of new cards. The game display 106 of the display area 102 may include other features that are not shown, such as paytables, navigation controls, etc.

In other example embodiments, the primary gaming portion 108 may display a grid (or equivalent arrangement) of game elements or game element positions (also referred to as "reel stop positions" herein). Although not shown in FIG. 1, the grid may include three rows and five columns of game elements, which may form a game outcome of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

Figure 2:
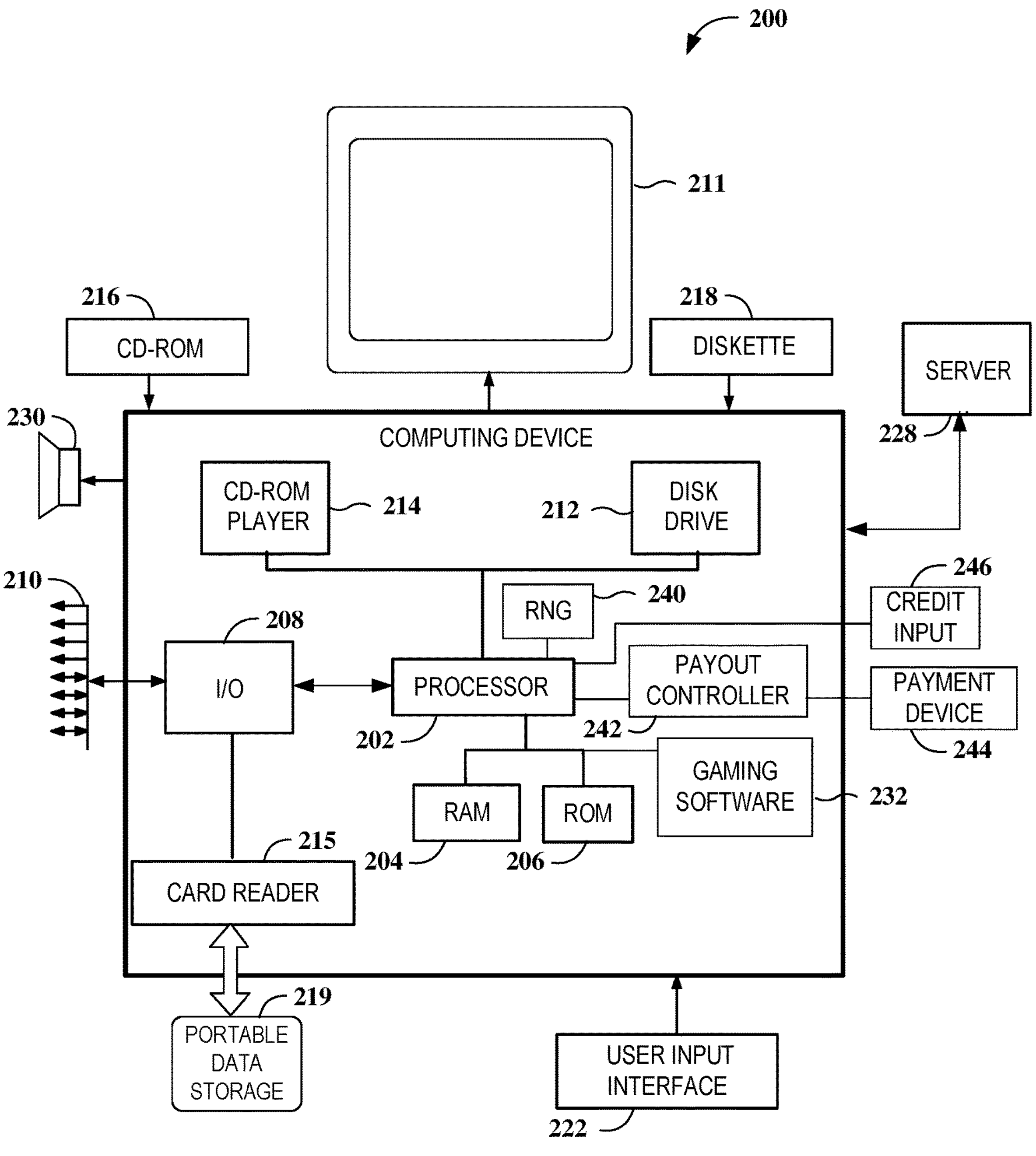
FIG. 2 is a block diagram illustrating a computing arrangement according to embodiments of the invention.

Although FIG. 1 illustrates a particular implementation of some of the embodiments of this invention in a casino or electronic gaming machine ("EGM"), one or more devices may be programmed to play various embodiments of the invention. The present invention may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the invention is illustrated in FIG. 2.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 200 of FIG. 2 is an example computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions in accordance with the present invention typically includes a central processor (CPU) 202 coupled to random access memory (RAM) 204 and some variation of read-only memory (ROM) 206. The ROM 206 may also represent other types of storage media to store programs, such as programmable ROM (PROM), erasable PROM (EPROM), etc. The processor 202 may communicate with other internal and external components through input/output (I/O) circuitry 208 and bussing 210, to provide control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to the display 211, which represents a display on which the gaming activities in accordance with the invention are presented. The display 211 represents the "presentation" of the game information in accordance with the invention, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, or inputting data to identify a player for a player loyalty system. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs may be implemented using hardware, software operable in connection with the processor 202, or some combination of hardware and software. The present invention is operable using any known RNG, and may be integrally programmed as part of the processor 202 operation, or alternatively may be a separate RNG controller 240. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 indicating a payout is to be made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout device 244 may also be provided in gaming machine embodiments, where the payout device 244 serves as the mechanism providing the payout to the player or participant. In some embodiments, the payout device may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency. In yet other embodiments, the payout device 244 may send a signal via the network server 228 or other device to electronically provide a credit amount to an account associated with the player, such as a credit card account or player loyalty account. The computing arrangement 200 may also include accounting data stored in one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, etc., for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payout device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described hereinabove. For example, the software 232 may present, by way of the display 211, representations of symbols to map or otherwise display as part of a slot-based game having reels. However, in other embodiments, the principles of this concept may be applied to poker games or other types of games of chance. One or more aligned positions of these game elements may be evaluated to determine awards based on a paytable. The software 232 may include instructions to provide other functionality as known in the art or as described and shown herein.

According to some embodiments, a gaming device can be configured to have sub-symbol overlays that specify a replication feature that may replicate a card associated with the sub-symbol overlay and either replace a specified card that is adjacent to the card associated with the sub-symbol overlay, or create a multi-indicia card using the replication. Replication may mean a direct copy of the card associated with the sub-symbol overlay or may mean providing a card that is related to the card associated with the sub-symbol overlay according to predefined rules.

In some embodiments, the sub-symbols may act as mirror features, where they can reflect an object card to the left, right, or both. In some embodiments, the reflection is a replication feature that copies the object card over to the card position indicated by an indicator on the sub-symbol. In other embodiments, the replication feature may only replace one or more adjacent cards if it helps the poker hand. In still other embodiments, the replication feature may copy an object card over to a target card position and create a multi-indicia card in the target card position that includes indicia of the object card and the target card, where an evaluation may use the best 5 cards (or similar) when evaluating the poker hand. In still other embodiments, the replication feature may create a new card based on a predefined rule or set of rules. For example, a set of rules may specify that the replication feature create a card of the same suit and plus or minus one rank value from the object card. In another example, the set of rules may specify that the replication feature create a card with the same rank and a different suit from the object card.

In some embodiments, the replication feature may further utilize a credit value or multiplier value specified in the sub-symbol to provide bonus credits or multiply wins on the current poker hand, or one or more future poker hands. In other embodiments, the replication feature may specify creating a wild card, or another type of special card.

In some embodiments, if a player a player received a card (i.e., the object card) with a mirror sub-symbol specifying a rightward direction. Here, the card to the right of the object card (i.e., the target card) would be changed to the be the same as the object card (or the object card could be changed into the target card). This switching may be dependent on which card helps the poker hand the most, is the highest card, lowest card, best card, etc. In other embodiments, this replication may only occur if it improves the poker hand (or other type of game outcome). In some embodiments, the effect of a mirror card may not be a direct copy or replication, but may instead be a modification of one or more adjacent cards based on a rule or set of rules. In other embodiments, a replication or mirror trigger could be received on a current poker hand, but not take effect until one or more subsequent poker hands are played. Alternatively, a replication feature may be implemented on a current poker hand and one or more future poker hands. Here, for example, the replication indicator may be a sub-symbol overlay that is associated with a symbol or card position and is locked for one or more additional poker games. In this example, a number of games where the replication feature is active may be reset or increased if additional replication or bonus sub-symbol overlays are received during a bonus period or bonus event.

The replication feature may be triggered by a sub-symbol overlay or a special card that is dealt, or may be based on a specific card being dealt or drawn to particular card position. That is, in some embodiments every card has a chance of a sub-symbols (where, for example, the sub-symbols can be dependent on the cards dealt and/or drawn), while in other embodiments the sub-symbols may be independent and based, for example, on the card location or position on the game grid.

In some embodiments, the feature may not require any additional wager, while in other embodiments, an additional or side wager may be required to be eligible for the feature. Here, the additional bet structure could be done in multiple ways. For example, it could be 5+1, 5+2, 5+3, 5+4, 5+5, 5+45, etc. structure, where the first number is the about wagered on each poker hand and the second number is the amount of the side wager for the replication feature. Here, an increase in the side wager size may correlate the frequency and/or value of the feature. In other embodiments, the replication feature could be based on the amount of a wager or side wager, where various wager amounts unlock various card positions to have the ability to replicate. The replication feature could be utilized in single hand poker games, multi hand poker games, Keno games, Bingo games, slots games, or other types of games of chance.

In one example embodiment, a single hand video poker game may require a 5+5 wager (with 5 credits being wagered on the poker hand and a side or bonus bet of 5 credits being wagered to be eligible for the replication feature). In this embodiment, three types of sub-symbol overlays can be received on the cards or card positions in the poker game: mirror right sub-symbols, mirror left sub-symbols, or mirror both sub-symbols. When one or more bonus sub-symbols are received, the gaming device determines if a replication action designated by each of the received one or more bonus symbols improves the hand, and then initiates the replication process based on this determination to replicate cards if beneficial. Here, the player may get the best of the 2 cards, or 3 cards if both.

In another example embodiment, a multi hand poker game (e.g., three hands played in a single poker gaming event) may require a 5+5 wager (with 5 credits being wagered on each poker hand and a side or bonus bet of 5 credits being wagered on each hand to be eligible for the replication feature) for a total bet of 30 credits or coins. Here, each of the three poker hands may be eligible for the replication sub-symbols which may specify mirror right, mirror left, or mirror both.

According to other embodiments, a gaming device can be configured to provide a poker game where random cards may have multiple sides. These multi-sided cards may be dealt or drawn during a poker game, where a first side has normal card indicia labeled on it, but a hidden second side (or back side) has bonus indicia such as credit awards, multipliers, wild card indicia, or other game modifying indicia that may be used in the current poker game, or one or more future poker games. In other embodiments, the multi-sided cards may have more than 2 possible sides: a front side showing a normal card indicia (that may or may not have a bonus sub-symbol overlay or other indicator that it is a multi-sided card), and two or more other possible bonus sides that include bonus indicia. Here the bonus sides of the cards may be hidden or there may be some indication of the bonus indicia that each bonus side includes. In some embodiments, a multi-sided card with multiple bonus sides may be spun or flipped such that the player can see the front side and the multiple bonus sides cycling through before the multi-sided card lands on the front side (meaning no bonus is won) or one of the bonus sides (in which case the bonus indicia shown on the received bonus side) is used to modify the poker game or otherwise provide a bonus amount or multiplier.

In some embodiments, only some of the playing cards in a particular poker game can have multiple sides with different indicia. These special playing cards may be selected at random and used for only a single poker gaming event, or predefined cards in a virtual card deck may be assigned to have multi-sides. In yet other embodiments, sub-symbol overlays may be associated with particular card positions, which when received at a particular card position during a poker gaming event may cause the associated card to become a multi-sided card (where, for example, the bonus side of the designated multi-sided card has randomly determined bonus indicia. Thus, in this example, the cards associated with a symbol position having a sub-symbol bonus overlay may have typical playing card indicia (rank and suit) on one side and special indicia on other side, such as other card indicia (rank and/or suit), wilds, multipliers, credit awards, progressives, multi-indicia cards, etc.

In other example embodiments, each of the cards in a 52-card deck may be multi-sided cards. In yet other embodiments, each of the 52 cards may have a normal front side while having royal card indicia on the back or bonus side.

In various embodiments, these multi-sided cards can be implemented in poker games in a variety of manners. In some embodiments, when a player receives a winning poker hand the unused cards (kicker cards not used in the win) flip over to see if they help. In other embodiments, as mentioned above, as sub-symbol overlay could be the catalyst to have a multi-sided care flip over so the bonus indicia can be applied. In other embodiments, if the player does not receive a winning poker hand, one or more cards may be flipped to reveal the second side of the card and perhaps provide a winning poker hand. In still other embodiments, if a player holds a card and draws, it may improve the chance the card flips.

In some embodiments, the feature may not require any additional wager, while in other embodiments, an additional or side wager may be required to be eligible for the feature. Here, the additional bet structure could be done in multiple ways. For example, it could be 5+1, 5+2, 5+3, 5+4, 5+5, 5+45, etc. structure, where the first number is the about wagered on each poker hand and the second number is the amount of the side wager for the multi-sided card feature. Here, an increase in the side wager size may correlate the frequency and/or value of the feature. In other embodiments, the multi-sided card feature could be based on the amount of a wager or side wager, where various wager amounts unlock various card positions to have the ability to flip a card to a second or bonus side. The multi-sided card feature could be utilized in single hand poker games, multi hand poker games, Keno games, Bingo games, slots games, or other types of games of chance.

In one example embodiment, a single hand video poker game may require a 5+5 wager (with 5 credits being wagered on the poker hand and a side or bonus bet of 5 credits being wagered to be eligible for the multi-sided card feature). In this embodiment, the virtual deck of cards includes cards having one side being a normal card rank and suit from the 52-card deck and the other side having credit values, multipliers, or blanks. Here, on winning poker hands, the cards not used for the winning poker card combination flip over. On pat hands, a player may pick one card to flip. In some embodiments, the unpicked (or unused cards) may be revealed to see what the other possible bonus outcomes were.

In another example embodiment, a multi hand poker game (e.g., three hands played in a single poker gaming event) may require a 5+5 wager (with 5 credits being wagered on each poker hand and a side or bonus bet of 5 credits being wagered on each hand to be eligible for the multi-sided card feature) for a total bet of 30 credits or coins. Here, each of the three poker hands may be eligible for the multi-sided card feature when a bonus sub-symbol overlay is associated with one or more of the cards positions in the game grid forming the three poker hands. That is, each of the 15 card symbol positions may be associated with a bonus sub-symbol overlay. When a card position is associated with a bonus sub-symbol overlay, a particular bonus indicia is randomly determined for a bonus side of the associated card and that card is flipped over to reveal the bonus indicia.

In other embodiments, a gaming device can be configured to associate higher pays on a poker paytable with progressive awards, where when a poker hand associated with one of the higher poker pays is awarded, a random determination is made along with a visual presentation to the player, of whether the progressive award associated with that higher poker pay is also awarded to the player.

In some embodiments, when a player gets a poker hand associated with a particular pay in a paytable, the player has a chance to win a mystery progressive in addition (or instead of) the pay associated with the poker hand in the paytable. In some embodiments, a visual tease is presented to the player to heighten anticipation, where at end of tease the player either wins progressive and pay, or just gets the original pay in the paytable.

In some embodiments, the feature may not require any additional wager, while in other embodiments, an additional or side wager may be required to be eligible for the feature. Here, the additional bet structure could be done in multiple ways. For example, it could be 5+1, 5+2, 5+3, 5+4, 5+5, 5+45, etc. structure, where the first number is the about wagered on each poker hand and the second number is the amount of the side wager for the mystery progressive feature. Here, an increase in the side wager size may correlate the frequency and/or value of the feature. In other embodiments, the mystery progressive feature could be based on the amount of a wager or side wager, where various wager amounts unlock various progressive levels or amounts at each progressive level. The mystery progressive feature could be utilized in single hand poker games, multi hand poker games, Keno games, Bingo games, slots games, or other types of games of chance.

In one example embodiment, a single hand video poker game may require a 5+5 wager (with 5 credits being wagered on the poker hand and a side or bonus bet of 5 credits being wagered to be eligible for the mystery progressive feature). In this embodiment, if the player receives a Straight, Flush, Full house, Four of kind, or Royal Flush, then the player has a chance to win a progressive award corresponding to a respective one of the Straight, Flush, Full house, Four of kind, or Royal Flush. In some embodiments, mystery presentation may be initiated where a display of cards flipping, or another animation may be played to build player anticipation. At the end of the mystery presentation, the player either wins original pay or the original pay plus progressive. The progressive meters may reset as follows:

Straight $10
Flush $15
Full House $50
Four of Kind $500
Royal Flush $10,000

In another example embodiment, a multi hand poker game (e.g., three hands played in a single poker gaming event) may require a 5+5 wager (with 5 credits being wagered on each poker hand and a side or bonus bet of 5 credits being wagered on each hand to be eligible for the multi-sided card feature) for a total bet of 30 credits or coins. Here, if the player receives a Straight, Flush, Full house, Four of kind, or Royal Flush on one or more of the poker hands, the player will then be given a chance to win a progressive award corresponding to a respective one or more of the Straight, Flush, Full house, Four of kind, or Royal Flush to win the corresponding progressive. If two or more of the poker hands end with a triggering poker hand (e.g., a Straight, Flush, Full house, Four of kind, or Royal Flush in this embodiment), a mystery presentation for each triggering poker hand may occur thereby giving the player multiple chances at winning a progressive award.

In other embodiments, if multiple hands have one of the triggering poker hands associated with a progressive, the player may only receive one chance at winning that progressive award amount, but may be given better odds of winning it (for example, based on the number of triggering hands), or may be given a multiplier to apply to the progressive award if won (for example, based on the number of triggering hands). For example, if a multi-hand poker game includes ten poker hands in a gaming event and Flush is received on the deal. The player may have ten changes to win the progressive award associated with a Flush, may have a ten times better chance of winning the progressive award than if there was only one hand with a flush final poker hand, or may receive a "10x" multiplier to multiply the progressive award if it is won.

Figure 3:
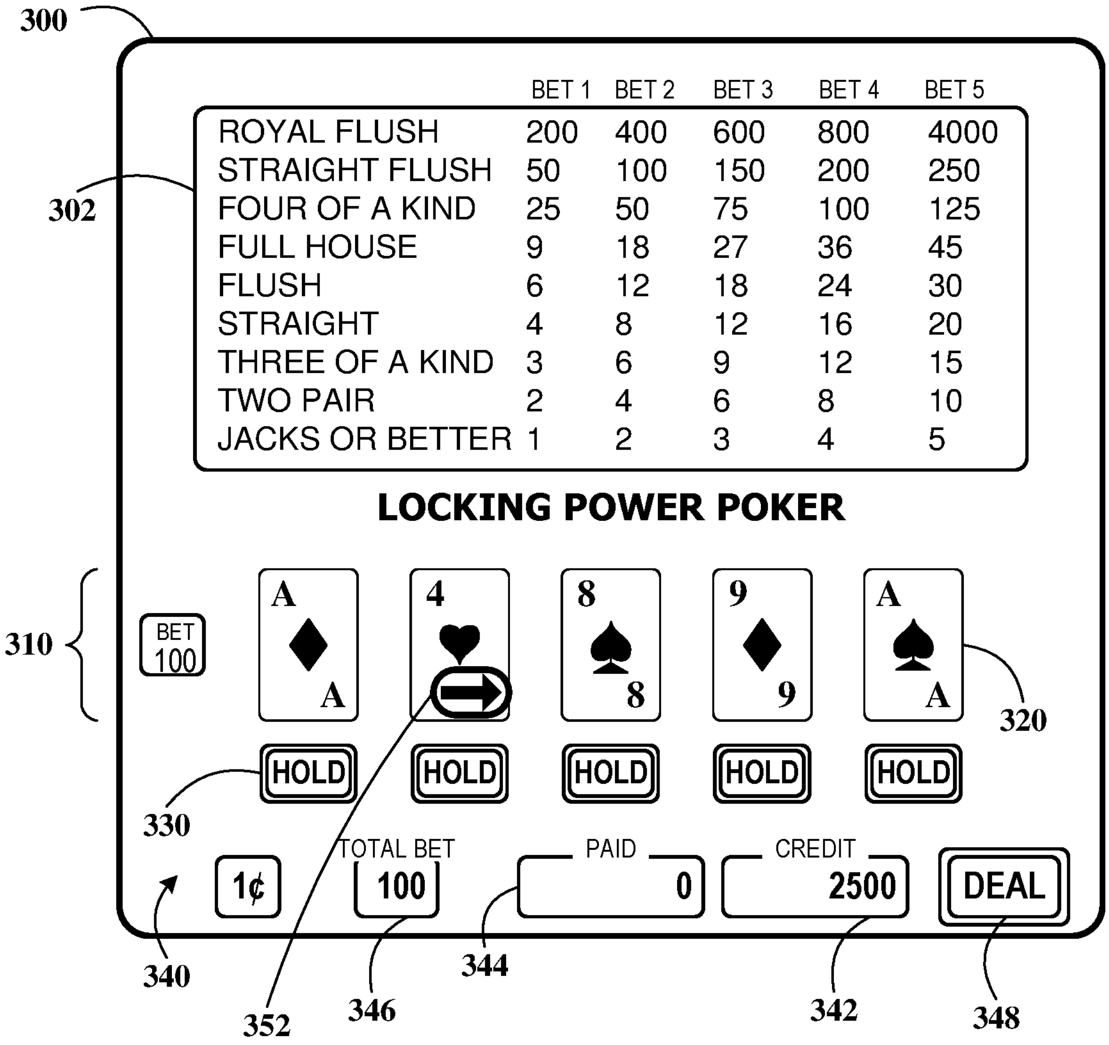
FIG. 3 is a detail diagram of a gaming device display according to embodiments of the invention.

FIG. 3 is a detail diagram of a gaming device display according to embodiments of the invention. Referring to FIG. 3, a gaming display 300 of a gaming device includes a game play area showing a game grid of card positions that allow for presentation of virtual playing cards 320 in poker hands 310, a game paytable 302, and a user interface or operations area 340. The user interface area 340 may include various meters and buttons, such as a "Credit" meter 342, a "Paid" indicator 344, a "Total Bet" meter or indicator 346, multiple "Hold" buttons 330 associated with the card positions of the poker hand 310, and a "Deal" or "Draw" button 348. In other poker games, or other types of games of chance, the game play area and/or the player interface area 340 may be different. In this embodiment, sub-symbol items 352 can be associated with the playing cards 320 or the card positions in the game grid, where the cards are displayed in a poker hand 310. In this embodiment, the sub-symbol item 352 is an overlay that is associated with an arrow to indicate which direction a replication feature may occur. In other embodiments, the sub-symbol item 352 may include other types of indicators to indicate different replication feature functionality. For example, the sub-symbol item 352 may include a dual sided arrow, a skip arrow (indicating a replication of the object card to a target card that is not adjacent to the object card), credit values, multipliers, or other game modifying indicia.

Although FIG. 3 shows a draw poker game, other embodiments may use a stud poker base game with the sub-symbol items 352. Additionally, in other embodiments, multi-hand poker games, various other poker games, blackjack games, slot games, or other games of chance may be used. In some embodiments, if a sub-symbol 352 is received during the play of the base poker game, the replication feature immediately takes place in the manner indicated on the sub-symbol. In other embodiments, the replication feature may be applied to one or more future poker gaming events (in addition to applying to the current gaming event or instead of applying to the current gaming event).

Figure 4A:
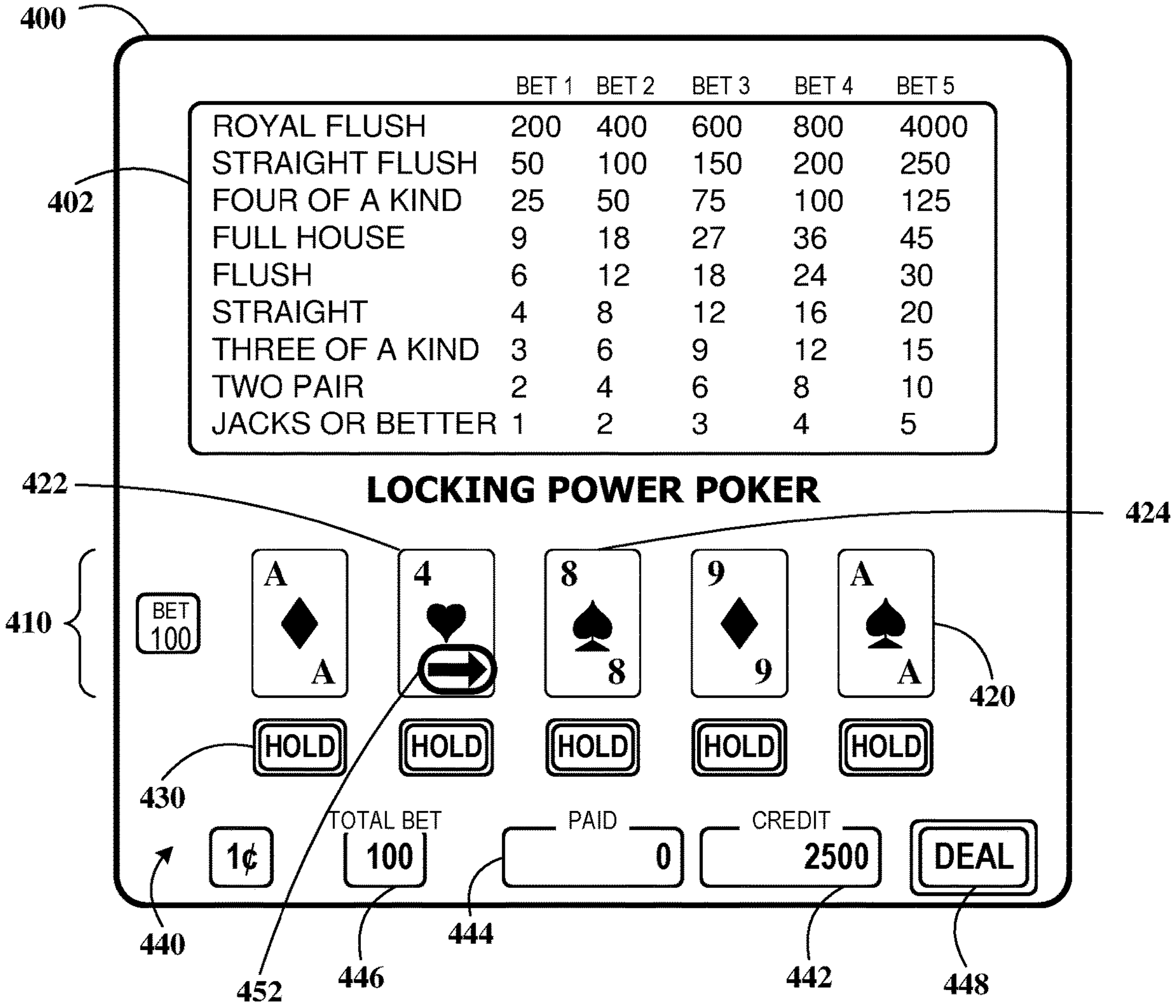
FIGS. 4A and 4B are detail diagrams of a gaming device display showing a game progression according to embodiments of the invention.
Figure 4B:
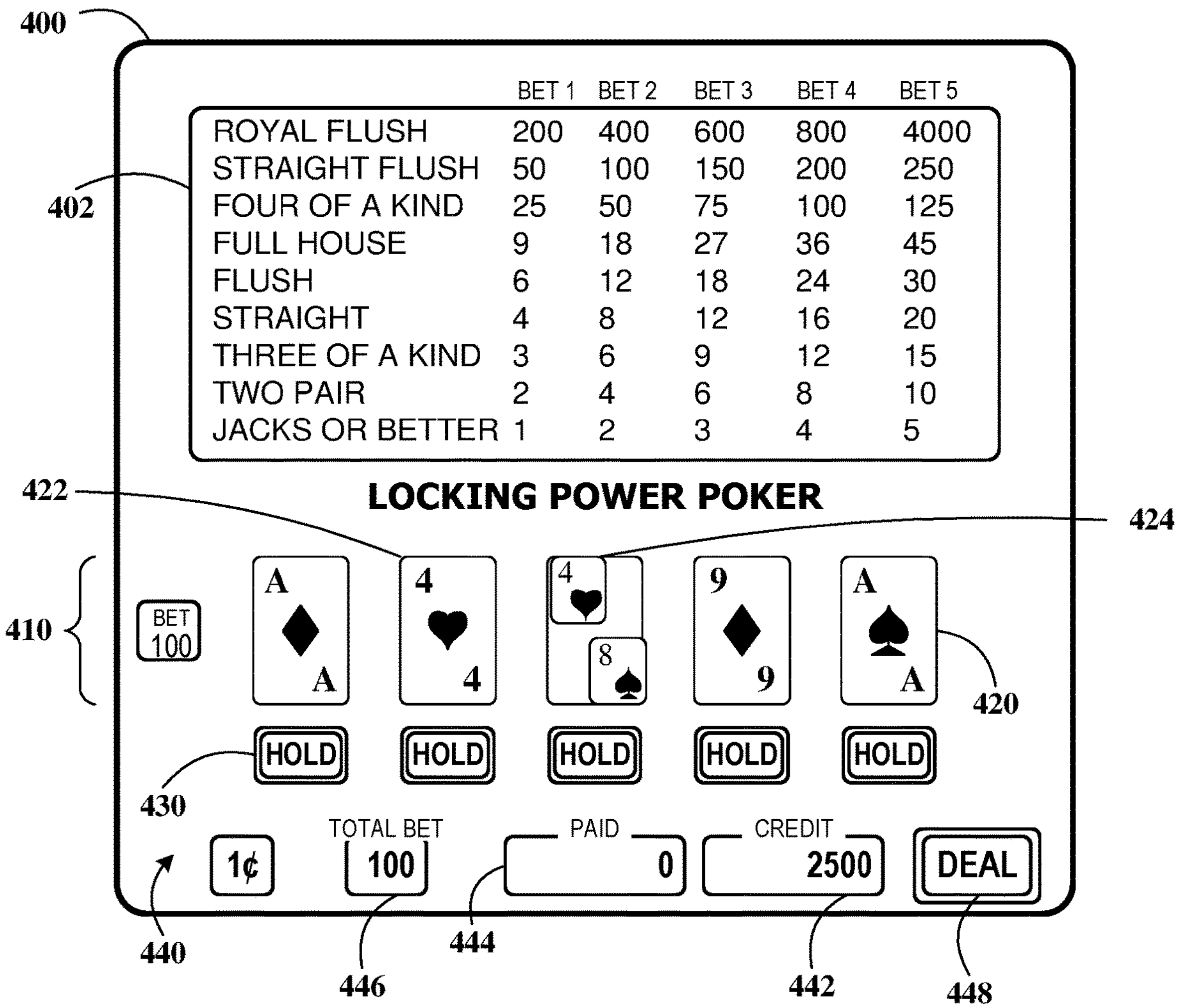

FIGS. 4A and 4B are detail diagrams of a gaming device display showing a game progression according to embodiments of the invention. Referring to FIG. 4A, a gaming display 400 of a gaming device includes a game play area showing a game grid of card positions that allow for presentation of virtual playing cards 420 in poker hands 410, a game paytable 402, and a user interface or operations area 440. The user interface area 440 may include various meters and buttons, such as a "Credit" meter 442, a "Paid" indicator 444, a "Total Bet" meter or indicator 446, multiple "Hold" buttons 430 associated with the card positions of the poker hand 410, and a "Deal" or "Draw" button 448. In other poker games, or other types of games of chance, the game play area and/or the player interface area 440 may be different. In this embodiment, sub-symbol items 452 can be associated with the playing cards 420 or the card positions in the game grid, where the cards are displayed in a poker hand 410. In this embodiment, the sub-symbol item 452 is an overlay that is associated with an arrow to indicate which direction a replication feature may occur. Here, the replication feature includes creating a multi-indicia card by copying the object card 422 associated with the sub-symbol item 452 to a target card 424 adjacent to the object card.

Referring to FIG. 4B, the result of this replication feature is shown where the target card 424 now a multi-indicia card showing the original 8 of Spades and the copied 4 of Hearts in the same card position. The player may hold this card in a draw poker game and get the benefit of having a guaranteed pair of Fours (and pair of Aces if the player chooses to hold the Aces). Hence, the player can form the best five card hand from the available 6 cards, although in other embodiments, the multi-indicia card may generate five additional hands using each combination of the six possible cards. In this embodiment, however, the player is paid for the best five card poker hand using all available six cards (assuming the multi-indicia card 424 is held). For evaluation purposes the second Four of Hearts in the multi-indicia card 424 will be considered having a rank of 4 and a suit of hearts that may be used in Pairs, 3 of a Kinds, Flushes, Straights, etc.

Figure 5A:
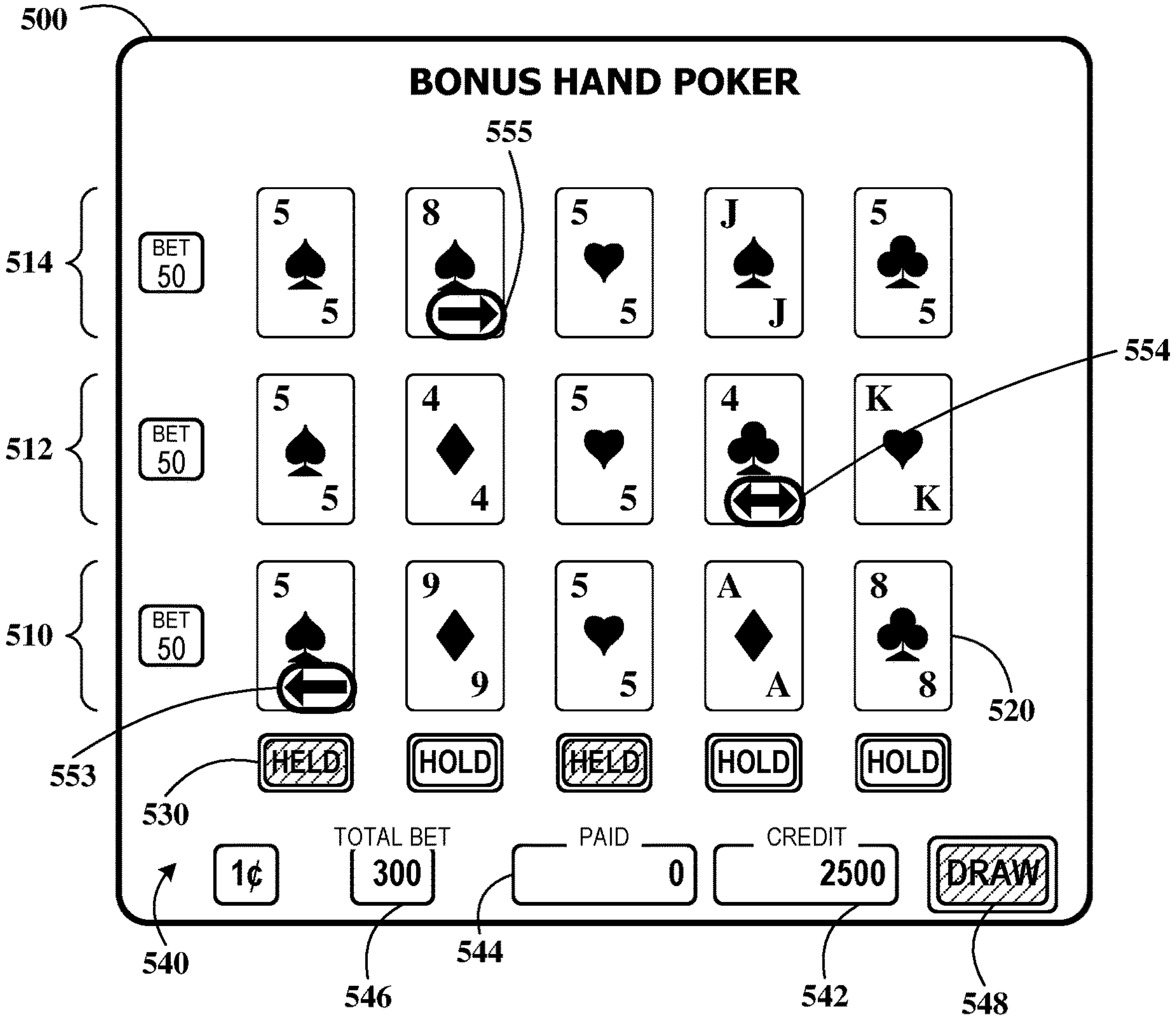
FIGS. 5A and 5B are detail diagrams of a gaming device display showing another game progression according to embodiments of the invention.
Figure 5B:
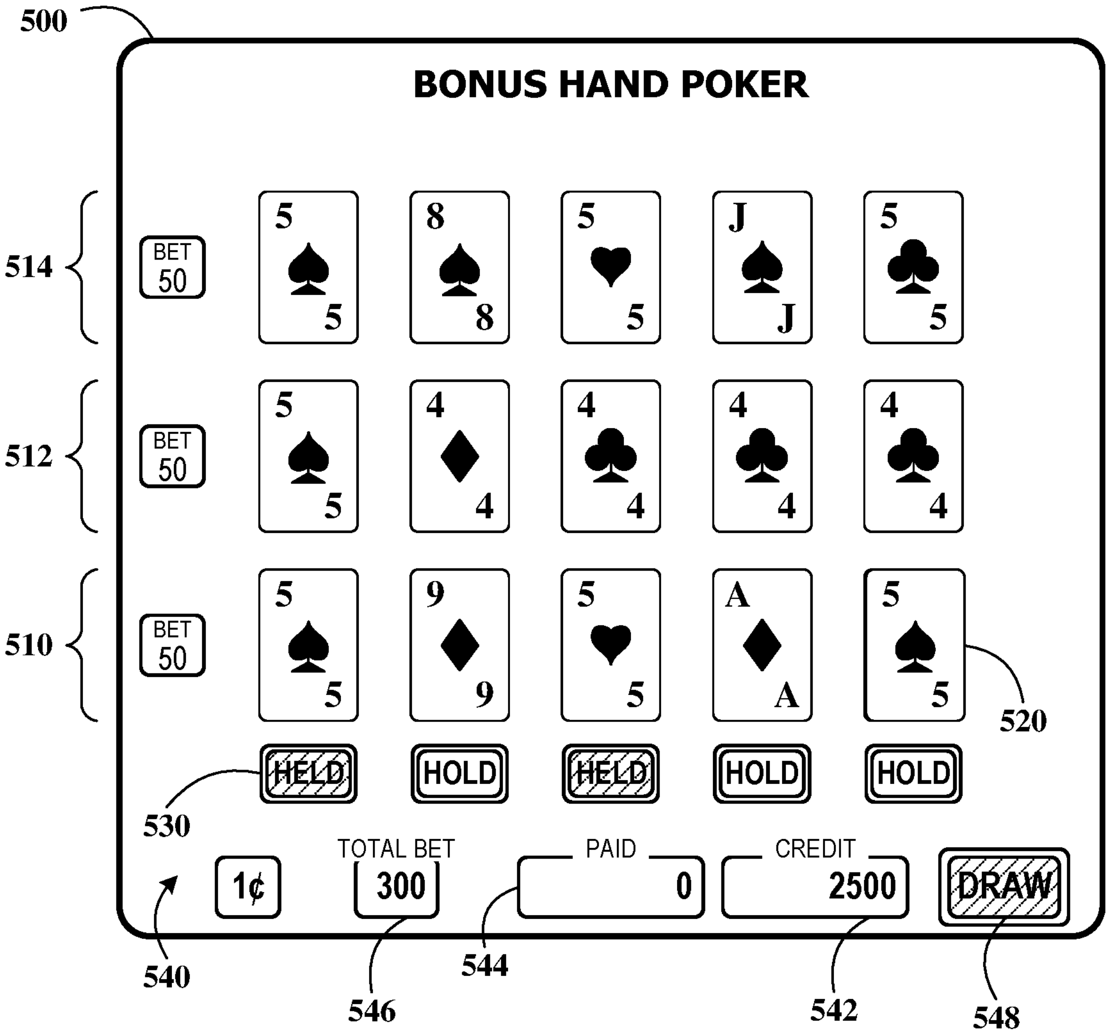

FIGS. 5A and 5B are detail diagrams of a gaming device display showing another game progression according to embodiments of the invention. Referring to FIG. 5A, a gaming display 500 of a gaming device includes a game play area showing a game grid of card positions that allow for presentation of virtual playing cards 520 in three poker hands 510, 512, 514, and a user interface or operations area 540. The user interface area 540 may include various meters and buttons, such as a "Credit" meter 542, a "Paid" indicator 544, a "Total Bet" meter or indicator 546, multiple "Hold" buttons 530 associated with the card positions of the poker hands 510, 512, 514, and a "Deal" or "Draw" button 548. In other poker games, or other types of games of chance, the game play area and/or the player interface area 540 may be different. In this embodiment, the first poker hand 510 is the hand where the initial cards 520 are dealt. Thereafter, these initially dealt cards 520 can be held where the held cards are replicated in the second poker hand 512 and third poker hand 514, and then replacement cards and drawn for each non-held card in the first poker hand 510 and for the remaining card positions in the second poker hand 512 and third poker hand 514. As shown in FIG. 5A, the player has received a first bonus item 553 in the first poker hand 510, a second bonus item 554 in the second poker hand 512, and a third bonus item 555 in the third poker hand 514. Here, the first bonus item 553 indicates a replication feature is to occur to the left of the card position with which it is associated, the second bonus item 554 indicates a replication feature is to occur both to the left and to the right of the card position with which it is associated, and the third bonus item 555 indicates a replication feature is to occur to the right of the card position with which it is associated.

Referring to FIG. 5B, the final poker hand for the gaming event is shown after the replication features have been implemented. Here, the 5 of Spades occupying the first card position was copied and replaced the card in the fifth card position as the first bonus item 553 indicated that the card to the left of the first card position was the target card position. This "wrap-around" feature functionality ensures that the feature can be used even when an end card receives a bonus item that indicates a direction where no other card positions are present. In other embodiments, this situation may prevent a replication feature for occurring and no changes will be made (i.e., the 5 of Spades would not be replicated). In yet other embodiments, this situation may result in an extra 5 of Spades card that is added to the left of the first card position and used in the evaluation of the first poker hand 510. Here, the evaluation may use the best five card poker hand of the six cards.

As shown in FIG. 5B, the 4 of Clubs in the second poker hand 512 was copied and replaced the cards on either side of the card position associated with the second bonus item 554. This results in a 4 of Kind poker outcome for the second poker hand 512. In the third poker hand, the replication of the card associated with the third bonus item 555 was not carried out because it hurt the overall evaluation of the third poker hand 514. In particular, replacing the 5 of Hearts with the 8 of Spades would lead to Two Pairs, which has a lower pay the previous 3 of Kind prior to any replication. Hence, the third poker hand 514 is maintained without implementing the replication feature.

Figure 6:
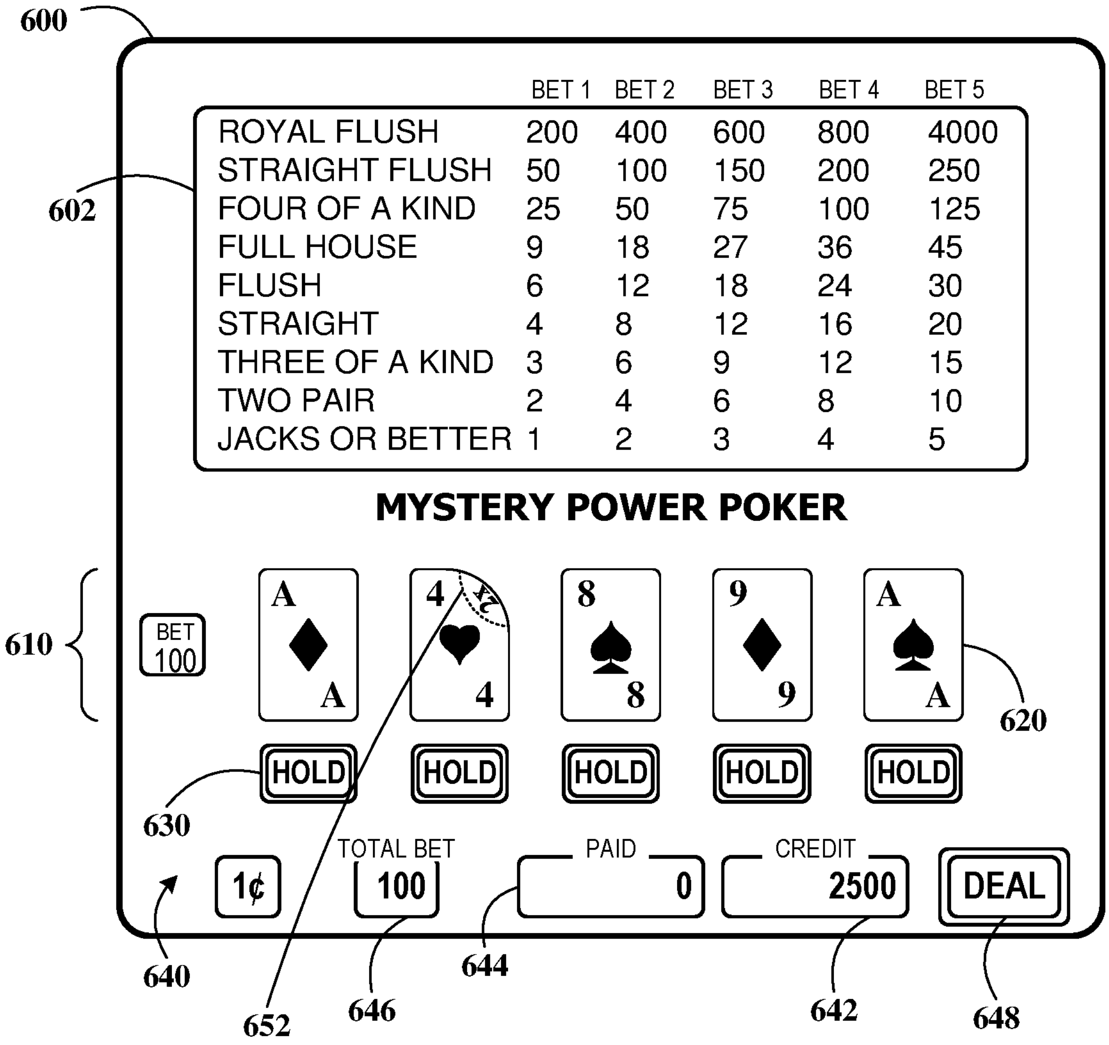
FIG. 6 is a detail diagram of a gaming device display according to embodiments of the invention.

FIG. 6 is a detail diagram of a gaming device display according to embodiments of the invention. Referring to FIG. 6, a gaming display 600 of a gaming device includes a game play area showing a game grid of card positions that allow for presentation of virtual playing cards 620 in poker hands 610, a game paytable 602, and a user interface or operations area 640. The user interface area 640 may include various meters and buttons, such as a "Credit" meter 642, a "Paid" indicator 644, a "Total Bet" meter or indicator 646, multiple "Hold" buttons 630 associated with the card positions of the poker hand 610, and a "Deal" or "Draw" button 648. In other poker games, or other types of games of chance, the game play area and/or the player interface area 640 may be different. In this embodiment, multi-sided card 652 may be received at one or more card positions in the poker hand 610. Here, if the player holds the Aces and doesn't receive another card in the second card position that improves the hand, the multi-sided card will flip over to reveal a "2×" multiplier. In other embodiments, the multi-sided card may flip over regardless if it is used in the final poker hand to provide the "2×" multiplier. In still other embodiments, the multi-sided card 652 could include bonus credit values, different card rank and suit, wild cards, etc.

Although FIG. 6 shows a draw poker game, other embodiments may use a stud poker base game with sub-symbol items to indicate the multi-sided card 652. Additionally, in other embodiments, multi-hand poker games, various other poker games, blackjack games, slot games, or other games of chance may be used.

Figure 7A:
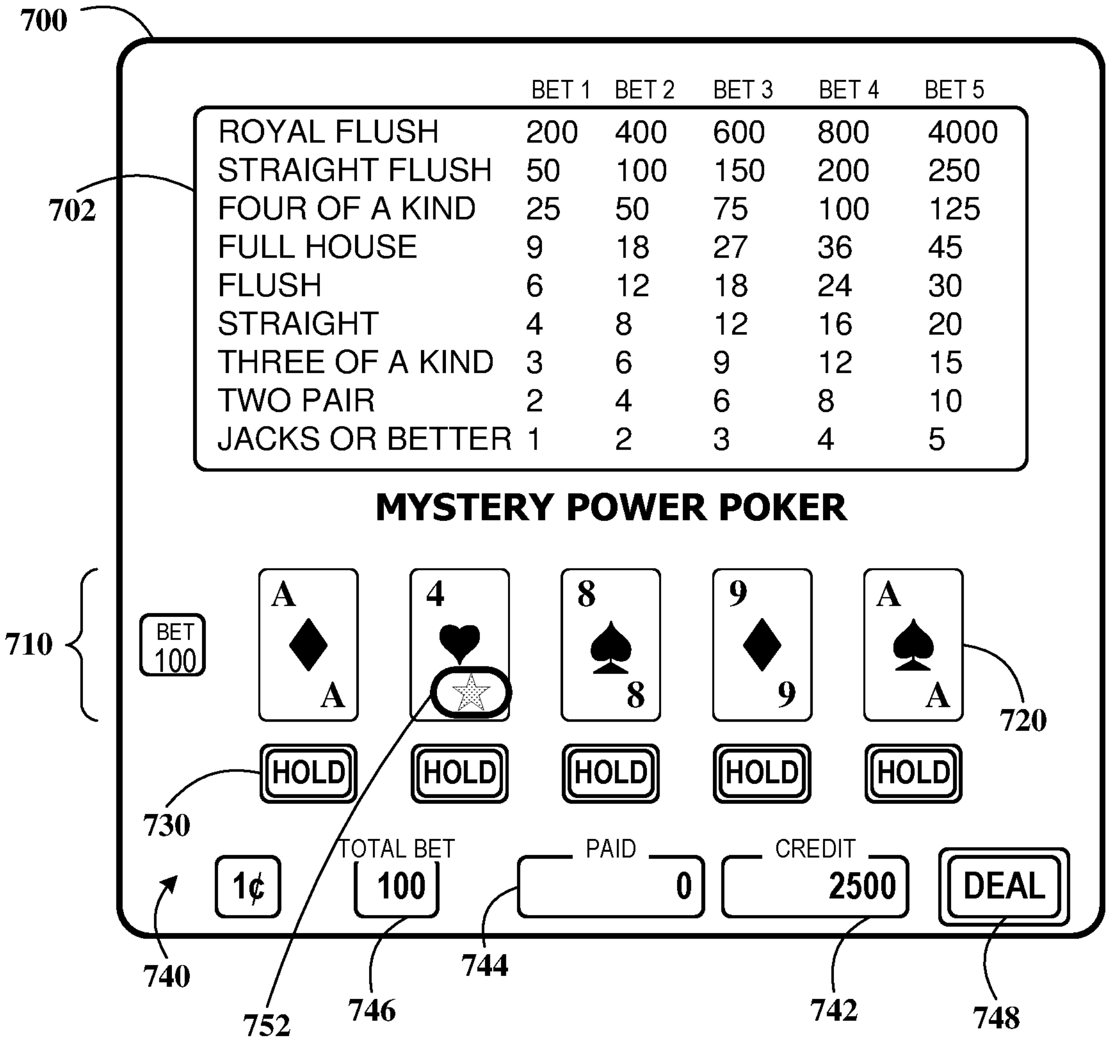
FIGS. 7A, 7B, and 7C are detail diagrams of a gaming device display showing another game progression according to embodiments of the invention.
Figure 7B:
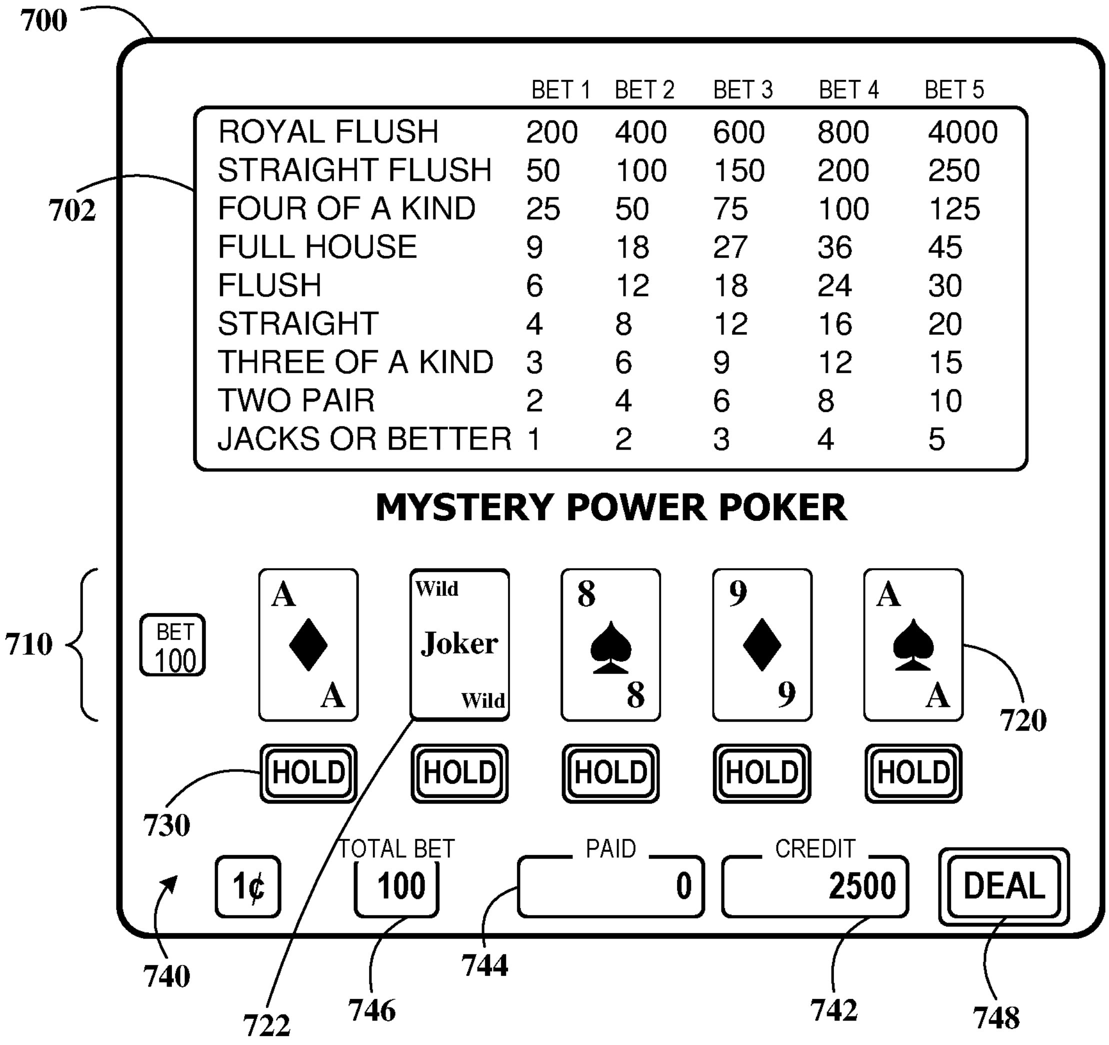
Figure 7C:
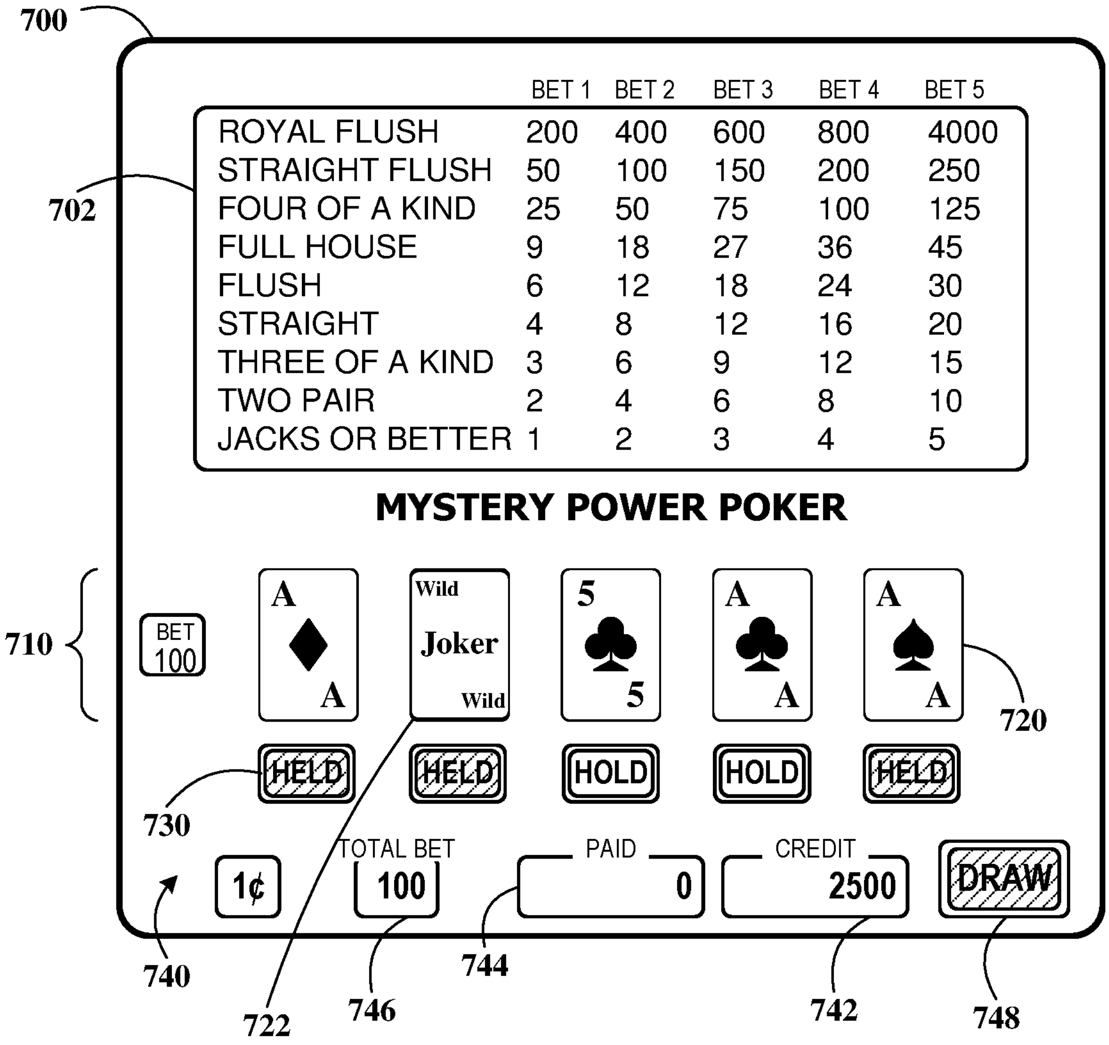

FIGS. 7A, 7B, and 7C are detail diagrams of a gaming device display showing another game progression according to embodiments of the invention. Referring to FIG. 7A, a gaming display 700 of a gaming device includes a game play area showing a game grid of card positions that allow for presentation of virtual playing cards 720 in poker hands 710, a game paytable 702, and a user interface or operations area 740. The user interface area 740 may include various meters and buttons, such as a "Credit" meter 742, a "Paid" indicator 744, a "Total Bet" meter or indicator 746, multiple "Hold" buttons 730 associated with the card positions of the poker hand 710, and a "Deal" or "Draw" button 748. In other poker games, or other types of games of chance, the game play area and/or the player interface area 740 may be different. In this embodiment, sub-symbol items 752 can be associated with the playing cards 720 or the card positions in the game grid, where the cards are displayed in a poker hand 710. In this embodiment, the sub-symbol item 752 is an overlay that is associated with a multi-sided card.

Referring to FIG. 7B, a second or back side of the playing card 722 associated with the sub-symbol item 752 is shown prior to holding or drawing additional cards, although in other embodiments the back side of the multi-sided card may not be shown prior to the draw, or the sub-symbol item may not even appear until a final poker hand is reached. Alternatively, the sub-symbol item 752 may be associated with the card position instead of the card itself such that it is maintained on the game grid even if the underlying card is not held an is replaced. In this instance, the multi-sided card 722 reveals its second side to be a wild card, which can be held and used to form a final poker hand. In embodiments where the second side reveals a bonus credit value or multiplier, the bonus credit value may be immediately awarded (or held and awarded at the end of the gaming event) and the multiplier may be held and used to multiply the final poker hand and/or one or more future poker hands while the multi-sided card 722 flips back around and can be held or discarded in the draw. Referring to FIG. 7C, the multi-sided card 722 is held along with the two Aces and a third Ace is picked up in the draw resulting in a Four of a Kind winning poker hand.

Figure 8:
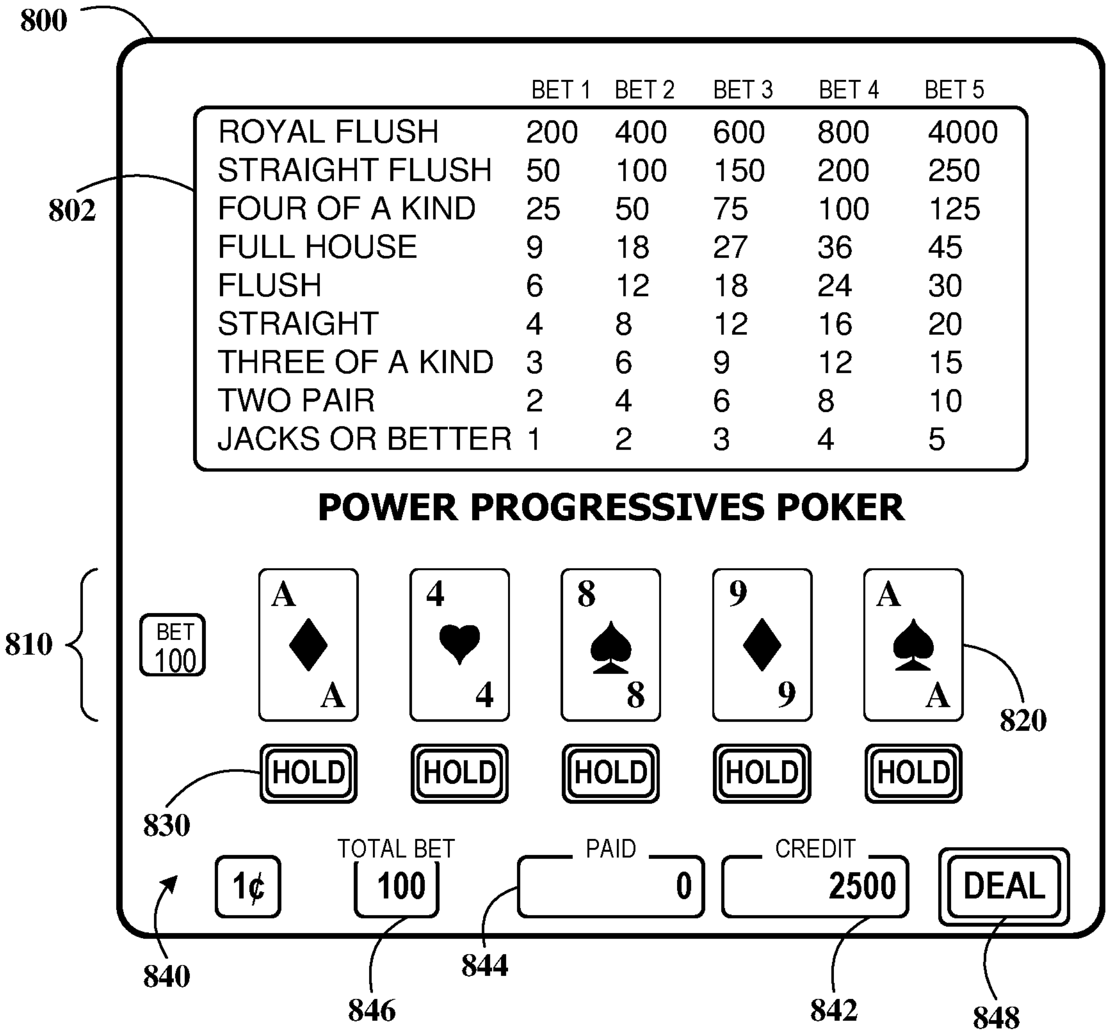
FIG. 8 is a detail diagram of a gaming device display according to embodiments of the invention.

FIG. 8 is a detail diagram of a gaming device display according to embodiments of the invention. Referring to FIG. 8, a gaming display 800 of a gaming device includes a game play area showing a game grid of card positions that allow for presentation of virtual playing cards 820 in poker hands 810, a game paytable 802, and a user interface or operations area 840. The user interface area 840 may include various meters and buttons, such as a "Credit" meter 842, a "Paid" indicator 844, a "Total Bet" meter or indicator 846, multiple "Hold" buttons 830 associated with the card positions of the poker hand 810, and a "Deal" or "Draw" button 848. In other poker games, or other types of games of chance, the game play area and/or the player interface area 840 may be different. In this embodiment, if a player receives one of a predetermined number of winning poker hands, the player has a chance at winning a progressive award associated with that type of winning poker hand.

Figure 9A:
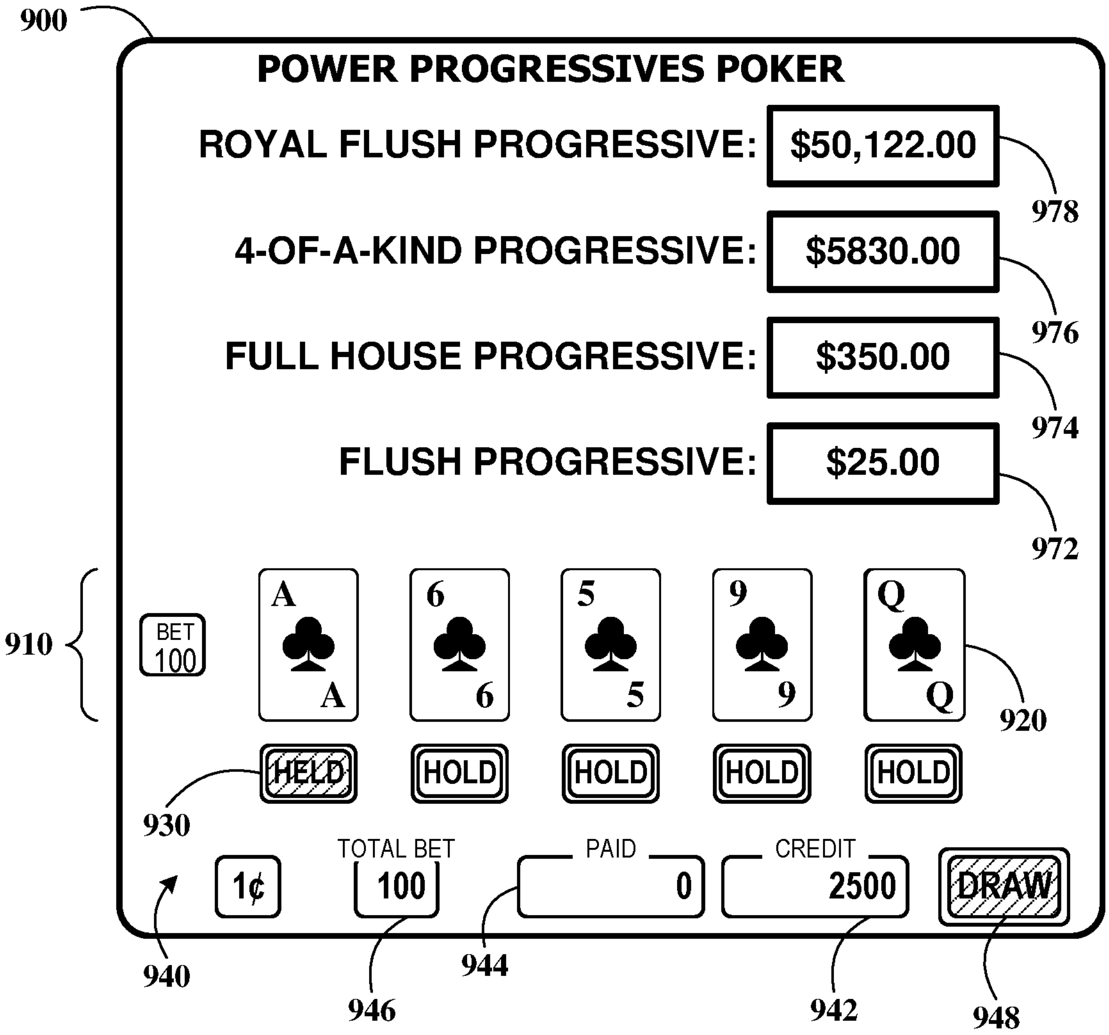
FIGS. 9A, 9B, and 9C are detail diagrams of a gaming device display showing another game progression according to embodiments of the invention.
Figure 9B:
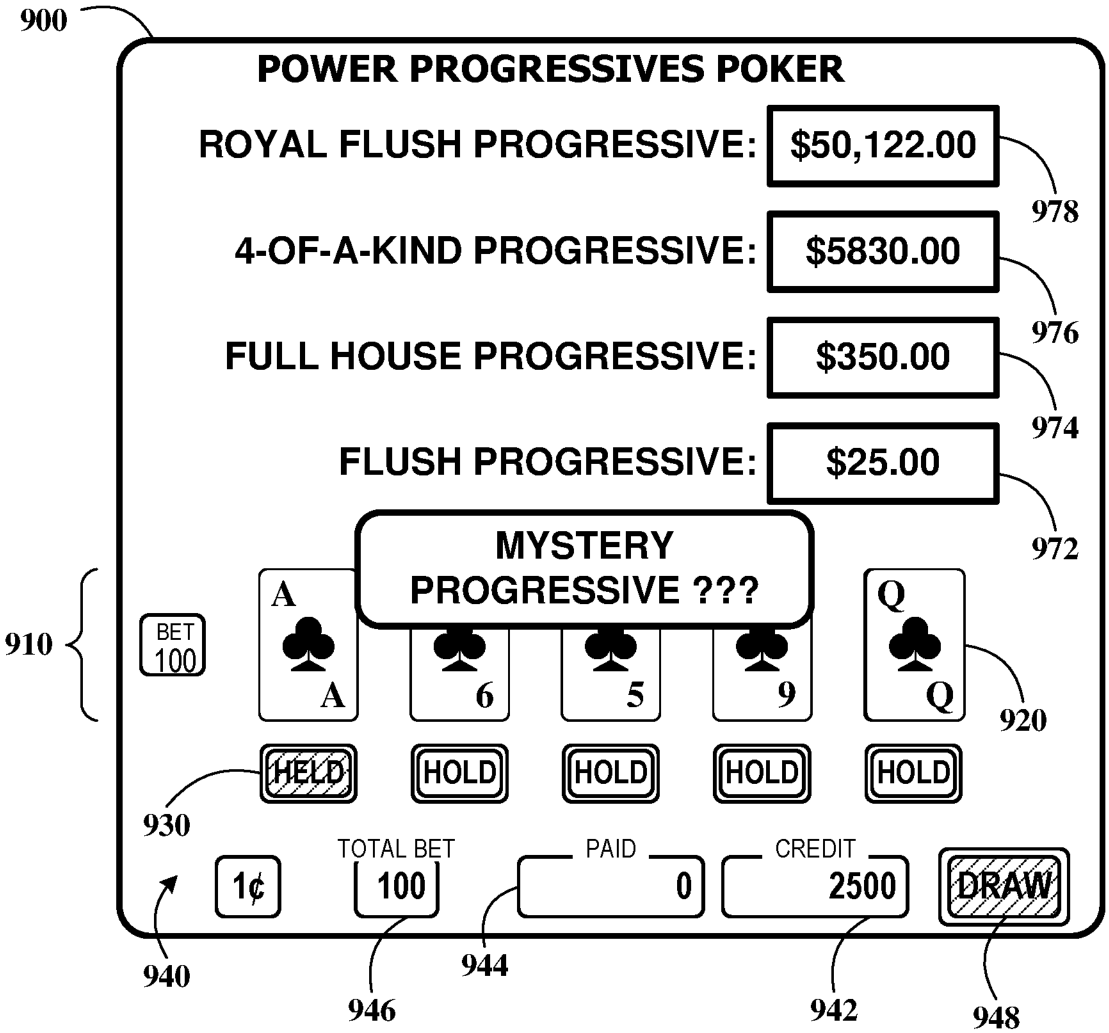
Figure 9C:
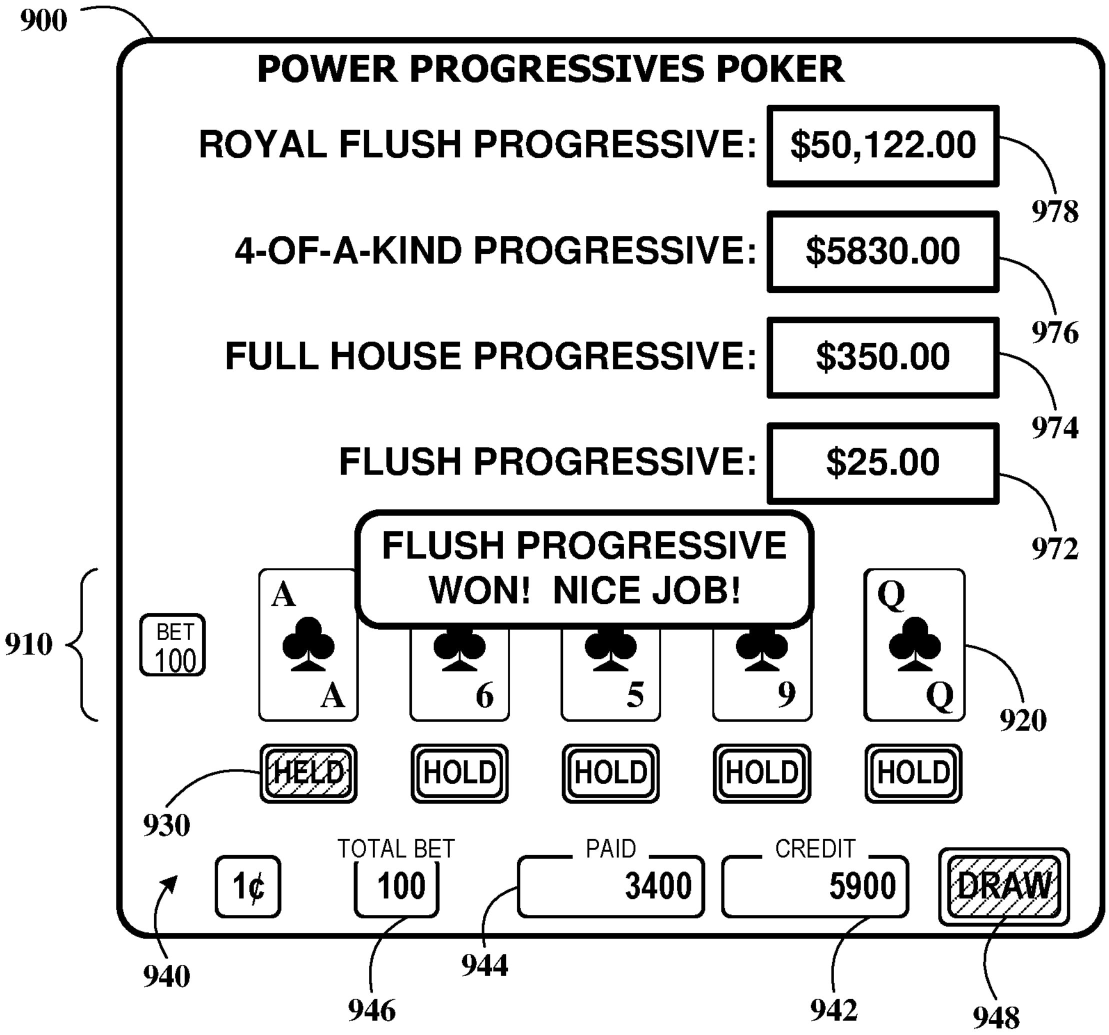

FIGS. 9A, 9B, and 9C are detail diagrams of a gaming device display showing another game progression according to embodiments of the invention. Referring to FIG. 9A, a gaming display 900 of a gaming device includes a game play area showing a game grid of card positions that allow for presentation of virtual playing cards 920 in poker hands 910, a multi-level progressive with multiple progressive meters 972, 974, 976, 978, and a user interface or operations area 940. The user interface area 940 may include various meters and buttons, such as a "Credit" meter 942, a "Paid" indicator 944, a "Total Bet" meter or indicator 946, multiple "Hold" buttons 930 associated with the card positions of the poker hand 910, and a "Deal" or "Draw" button 948. In other poker games, or other types of games of chance, the game play area and/or the player interface area 940 may be different. In this embodiment, sub-symbol items 752 can be associated with the playing cards 720 or the card positions in the game grid, where the cards are displayed in a poker hand 710. In this embodiment, the multi-level progressive includes a top progressive award associated with a Royal Flush poker outcome 978, a second level progressive award associated with a 4 of a Kind poker outcome 976, a third level progressive award associated with a Full House poker outcome 974, and fourth level progressive award associated with a Flush poker outcome 972. As shown in FIG. 9A, the final poker hand 910 resulting from a poker gaming event is a Flush poker outcome.

Referring to FIG. 9B, as the Flush poker outcome is associated with one of the poker progressive awards, a mystery presentation is initiated where the player may win the amount of the Flush progressive 972 in addition to the award for the flush poker outcome according to a poker paytable. Referring to FIG. 9C, the mystery presentation ends and in this case the player has won the Flush progressive 972. Hence, the player is paid for the flush poker outcome and the Flush progressive 972, which is reflected in the Paid meter 944. If the player had not randomly won the Flush progressive, the player would have still been paid the 900 credits for the Flush poker outcome based on the poker paytable.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out above and in the appended claims.

The invention claimed is:

1. A gaming device comprising:

a display including a video screen having a poker game play grid including a plurality of card positions;

a player interface including at least one button, the button configured to generate a signal in response to being activated;

a memory configured to store a virtual deck of cards, the poker paytable, and a credit amount;

a wager input device structured to receive physical items associated with currency values; and a processor operable to:

receive a signal indicating receipt of a physical item associated with a currency value;

increase the credit amount stored in the memory based on the currency value associated with the received physical item;

receive a primary game initiation signal including a wager amount, the wager amount deducted from the credit amount stored in the memory;

randomly deal an initial poker hand from the virtual deck of cards to the plurality of card positions in the poker game play grid on the display;

randomly determine if any of the plurality of card positions are associated with a bonus sub-symbol overlay;

mark any of the plurality of card positions in the poker game play grid that are determined to be associated with a bonus sub-symbol overlay, where the bonus sub-symbol overlay indicates that a virtual card in the marked card position is a multi-sided card having a hidden bonus side;

receive signals indicating cards to be held in the initial poker hand;

randomly provide replacement cards from the virtual deck of cards to replace any cards in the initial poker hand that were not held to form a final poker hand;

determine a bonus modifier for the hidden bonus side of any multi-sided cards;

reveal the hidden bonus sides of any multi-sided cards in the final poker hand;

evaluate the final poker hand as modified by any bonus modifier for poker awards; and increase the credit amount stored in the memory by any poker awards.

2. The gaming device of claim 1, wherein the bonus modifier includes a wild card symbol whereby the associated card is treated as a wild card that can be used as any card during the evaluation of the final poker hand.

3. The gaming device of claim 2, wherein the wild card symbol further includes a multiplier value used to multiply the value of any evaluated poker awards.

4. The gaming device of claim 1, wherein the bonus modifier includes a multiplier value used to multiply the evaluated poker awards.

5. The gaming device of claim 1, wherein the bonus modifier includes a credit value that is added to the evaluated poker awards.

6. The gaming device of claim 1, wherein determining a bonus modifier for the hidden bonus side of any multi-sided cards includes automatically selecting a largest value shown from the respective revealed bonus sides of the multi-sided cards.

7. The gaming device of claim 1, wherein determining a bonus modifier for the hidden bonus side of any multi-sided cards includes adding values shown on the respective revealed bonus sides of the multi-sided cards.

8. The gaming device of claim 1, wherein the processor is further operable to:

prior to revealing the hidden bonus sides of any multi-sided cards in the final poker hand, receive a signal indicating a selection of one of the multi-sided cards; and determine a bonus modifier as a modifier value associated with the selected one of the revealed bonus sides of the multi-sided cards.

* * * * *